(12) United States Patent
Hibma et al.

(10) Patent No.: US 6,231,002 B1
(45) Date of Patent: *May 15, 2001

(54) SYSTEM AND METHOD FOR DEFENDING A VEHICLE

(75) Inventors: Richard A. Hibma, Los Angeles; Richard W. Hilscher, Santa Clarita; Kitae Yim, Pacific Palisades; Edward C. Park, Santa Monica, all of CA (US)

(73) Assignee: The Boeing Company, Seal Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/491,798

(22) Filed: Mar. 12, 1990

(51) Int. Cl.⁷ ............................................. F42B 15/10
(52) U.S. Cl. ................................. 244/3.22; 244/3.15
(58) Field of Search ........................... 244/3.22, 3.15, 244/3.1; 89/1.11

(56) References Cited

U.S. PATENT DOCUMENTS

| | | | |
|---|---|---|---|
| 3,045,596 | * 7/1962 | Rae | 244/3.22 |
| 3,374,967 | * 3/1968 | Plumley | 244/3.22 |
| 3,806,063 | * 4/1974 | Fitzgerald | 244/3.22 |
| 3,843,076 | * 10/1974 | King et al. | 244/3.22 |
| 3,860,199 | * 1/1975 | Dunne | 244/3.22 |
| 4,347,996 | * 9/1982 | Grosso | 244/3.22 |
| 4,421,007 | * 12/1983 | Hanes | 89/1.11 |
| 4,674,408 | * 6/1987 | Stessen | 244/3.22 |
| 4,711,414 | * 12/1987 | Dunn | 244/3.22 |
| 4,867,393 | * 9/1989 | Faupell et al. | 244/3.22 |
| 4,928,906 | * 5/1990 | Sturm | 244/3.22 |

* cited by examiner

Primary Examiner—Michael J. Carone
(74) Attorney, Agent, or Firm—Lawrence N. Ginsberg

(57) ABSTRACT

A system and method for defending a vehicle against an approaching threat, is disclosed. A threat approaching the vehicle is identified. A rigid body is then deployed from the vehicle. Means associated with the body are provided for allowing controlled, guided propulsion of the body to position a reference axis of the body to a desired orientation relative to the threat and to translate the body substantially perpendicular to the reference axis, so as to eliminate the threat.

29 Claims, 8 Drawing Sheets

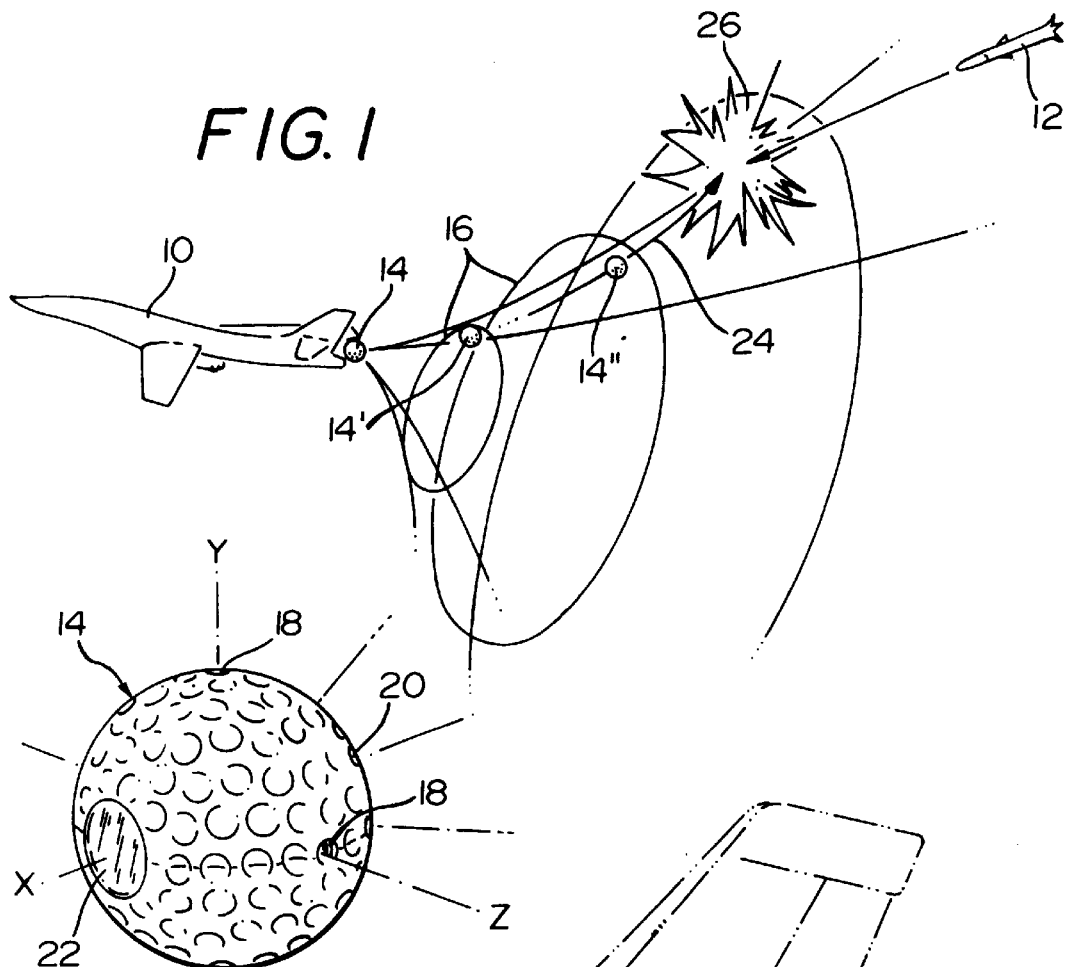
FIG. 1
FIG. 2
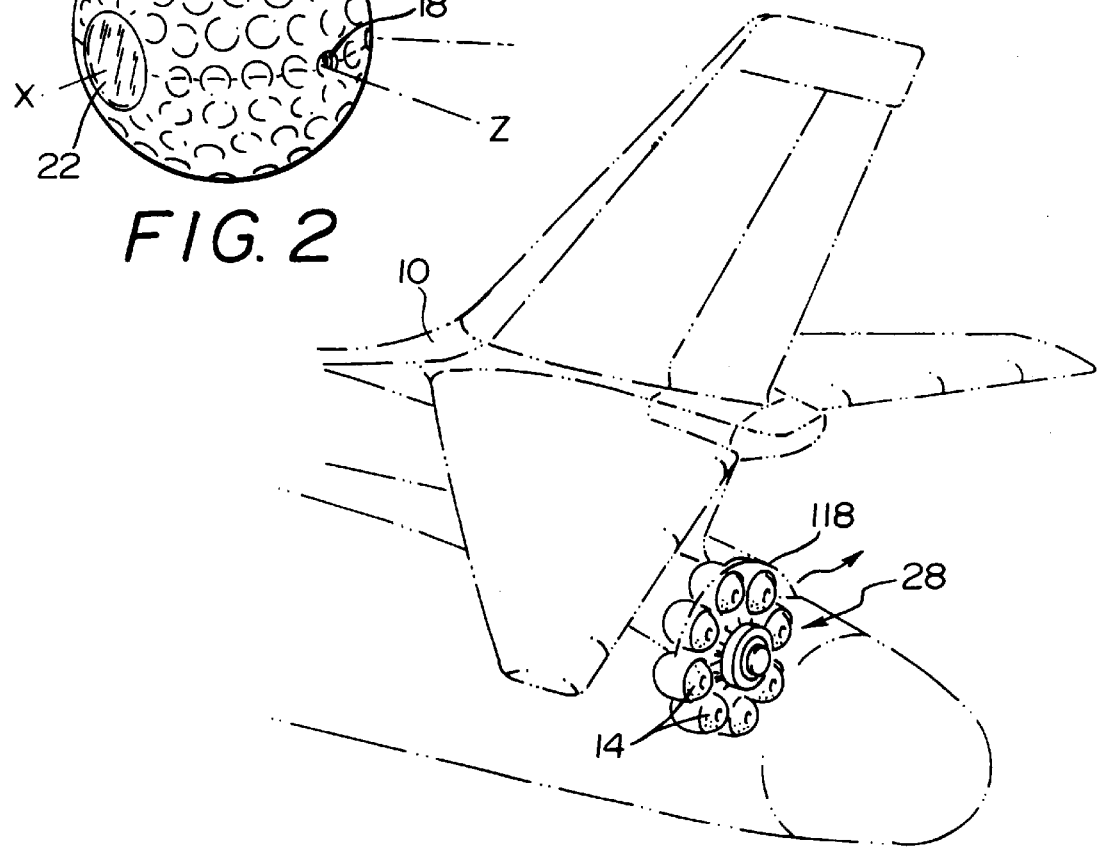
FIG. 3

SYSTEM AND METHOD FOR DEFENDING A VEHICLE

BACKGROUND OF THE INVENTION

1. Field of the Invention

The present invention relates to defense systems for atmospheric and extraterrestrial vehicles. More particularly, the present invention relates to a method and system for defending a vehicle which involves deployment of a body from the vehicle which can either serve as a decoy, by diverting an approaching threat, and/or serve as a kinetic kill device by positioning itself to collide with the threat.

2. Description of the Related Art

Defensive strategies used by aircraft to defend against approaching threats include passive defense to avoid a threat, active defense to deceive a threat, and lethal defense to kill the source of the threat. Methods currently being used to implement these defensive strategies include low altitude sanctuary, terrain masking, expendable countermeasures, electronic countermeasures (ECM), air-to-air missiles, air-to-surface missiles, and most recently, low observable, or "stealth" technology. These methods provide a substantial measure of survivability in a very hostile threat environment, but face continual pressure to keep pace with threat upgrades. Examples of prior art decoys/targets are included in the following references:

U.S. Pat. No. 2,957,417, issued to D. D. Musgrave, entitled "Missile Decoy", discloses a decoy system comprising a shroud fixed to the fins of a missile having an internal reflective surface of partial parabolic shape.

U.S. Pat. No. 2,898,588, issued to C. L. Graham, entitled "Attack Deviation Device", discloses a device comprising a hollow elongated member which is towed behind an aircraft. There is structure in the member for reflecting radar signals impinging thereon.

U.S. Pat. No. 4,808,999, issued to D. Toman, entitled "Towed Decoy with Fiber Optic Link", discloses a decoy which is towed behind an aircraft using a tow line which incorporates a fiber optic link through which signals are transmitted.

U.S. Pat. No. 4,419,669, issued to D. M. Slager, entitled "Controlled Scintillation Rate Decoy", discloses a decoy having a spherical body with microwave reflectors for reflecting incident radar energy in a manner to provide the decoy with the selected radar cross section.

U.S. Pat. No. 3,290,681, issued to R. H. Beteille, entitled "Device for Jamming Radar Detection and Interception of Ballistic Missiles", discloses the use of decoys consisting of metallized inflatable balloons.

U.S. Pat. No. 3,568,191, issued to J. C. Hiester, entitled "Method for Defending an Aircraft Against a Frontal Attack", discloses a method of launching a rocket in the direction of travel of an aircraft, the rocket containing, in a collapsed, condition a collapsible reflector having three orthogonal surfaces of wire mesh. The reflector is ejected from the rocket, expanded, and thereby towed, the reflector serving as a target for attracting the interceptor.

U.S. Pat. No. 3,126,544, issued to W. H. Greatbatch, Jr., entitled "Method of Deception for an Aircraft", discloses deployment of a spherically shaped decoy that is provided with a plurality of target plates. The decoy is illuminated with RF energy, the interceptor being deceived into following the decoy target.

U.S. Pat. No. 3,045,596 entitled "Guided Missile", issued to R. S. Rae discloses a controlled missile having structure including a spherical body having spaced ports for the discharge of jets in such a manner so as to lift and propel the missile. The guided missile is launched and controlled in aerial flight by the operator from the time of launching to the time of contact with a target. The Rae device weighs on the order of 300 pounds and is two feet in diameter. It carries explosives.

None of the aforementioned references disclose a defense system or apparatus having 1) a guidance system capable of operating independently of the launch vehicle and/or operator, and 2) a propulsion system having the ability to accurately maneuver the body relative to the threat in the absence of a substantial axial velocity so as to eliminate the threat.

As will be disclosed below, present applicants have developed a novel system and method for defending a vehicle against an approaching threat which provides these capabilities. This patent application is related to patent application Ser. No. 07/493,088, entitled "Killer Volleyball For Vehicle Defense" filed concurrently herewith and patent application Ser. No. 07/493,087, entitled "Killer Volleyball Launcher". All three patent applications are assigned to the present assignee, Rockwell International Corporation The term "Killer Volleyball" or "KV", as used herein and in the aforementioned, concurrently filed patent applications, refers to the presently disclosed apparatus for defending a vehicle, which is specifically claimed in Ser. No. 07/493,088. This is the terminology used during the KV's development by Rockwell International Corporation.

OBJECTS AND SUMMARY OF THE INVENTION

It is a principal object of the present invention to defend a vehicle from an approaching threat without the need for a propulsion system which provides a substantial axial velocity in the direction of the threat.

Another object is to defend the vehicle from a threat which may be approaching from the aft sector.

Another object is to defend an atmospheric vehicle from an approaching airborne threat.

These and other objects are achieved by the present invention which is a system and method for defending a vehicle against an approaching threat. In its broadest aspects, the system/method comprises first, identifying a threat approaching the vehicle. A rigid body is then deployed from the vehicle. Means associated with the body are provided for allowing controlled, guided propulsion of the body to position the reference axis of the body to a desired orientation relative to the threat and to translate the body substantially perpendicular to the reference axis, so as to eliminate the threat.

The rigid body (i.e. Killer Volleyball) has a plurality of spaced divert thruster means for translating the body relative to the threat upon deployment from the vehicle. A plurality of spaced attitude control thruster means are associated with the body for providing roll, pitch and yaw to orient the reference axis to a desired orientation relative to the threat. A guidance system, associated with the reference axis, is provided for communicating electronic signals to the attitude control thruster means and divert thruster means for controlling the position of the body relative to the threat to eliminate the threat. The guidance system preferably operates independently of the vehicle after deployment.

The body is preferably substantially spherical with a uniformly textured outer surface. It is particularly adaptable for use with atmospheric vehicles being defended against airborne threats. In one embodiment the guidance system includes a seeker means for tracking the threat, the seeker means providing electrical information for the guidance system to maneuver the apparatus for a collision with the threat, thereby providing a kinetic kill and elimination of the threat. In another embodiment the apparatus serves as a decoy, emitting a signal for diverting the threat away from the vehicle, thereby eliminating the threat.

Other objects, advantages and novel features of the present invention will become apparent from the following detailed description of the invention when considered in conjunction with the accompanying drawings.

BRIEF DESCRIPTION OF THE DRAWINGS

FIG. 1 illustrates the overall engagement scenario for a KV aircraft defense.

FIG. 2 is a perspective view of the KV apparatus.

FIG. 3 is a perspective view, partially broken away, of an aft end of an aircraft having a KV launcher and a plurality of KVs mounted therein.

The same elements or parts throughout the figures of the drawings are designated by the same reference characters, while equivalent elements bear a prime designation.

DETAILED DESCRIPTION OF THE PREFERRED EMBODIMENTS

Figure 4:
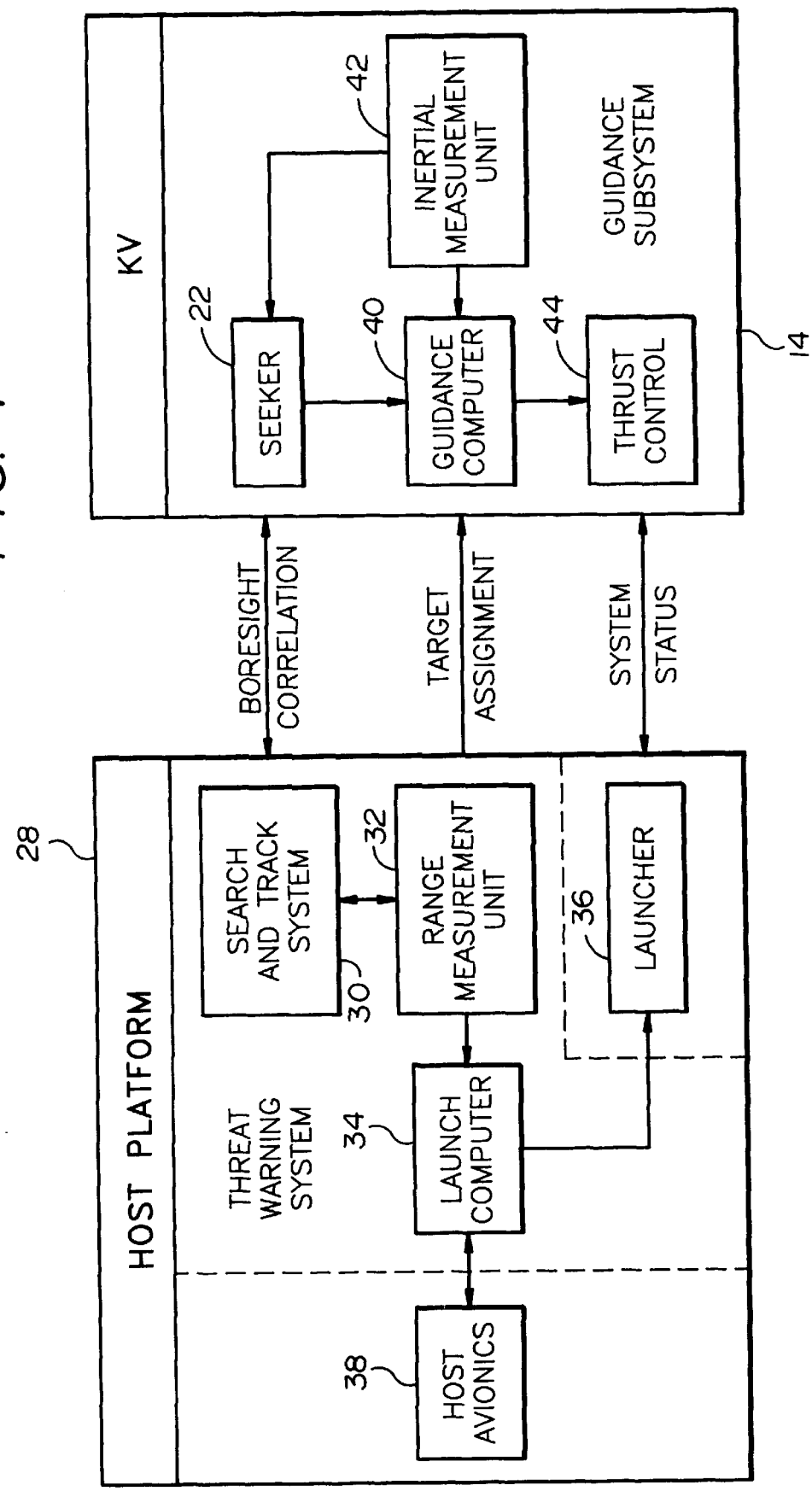
FIG. 4 is a functional schematic diagram of a threat warning system and KV guidance subsystem.

The overall engagement scenario for Killer Volleyball (KV) aircraft defense includes three general phases: threat detection, KV launch, and threat intercept.

Referring to the drawings and the characters of reference marked thereon, FIG. 1 illustrates this engagement scenario.

In threat detection, the target aircraft 10 recognizes an approaching threat 12 by means of a threat warning system (TWS). At this time in the scenario the KV 14 is supported by the aircraft. As will be more fully described below, the TWS is capable of detecting the threat 12 at a sufficient distance to permit adequate reaction and provides the data necessary to determine the proper timing for KV 14 release.

The TWS data is also used to provide situational awareness (SA) to the aircrew and possible participation in the KV 14 employment decision.

Once the threat 12 has been detected and the proper timing for KV 14 release determined by the fire control system, the KV 14 will be launched from the aircraft 10. Target lock-on against the attacking threat 12 will then occur at a safe distance behind the aircraft, releasing the KV 14. The launch is timed to permit a threat intercept within the KV operational envelope 16 and at a safe distance from the aircraft 10 being defended.

Referring now to FIG. 2, a perspective view of the KV 14 is illustrated. The KV 14 includes, inter alia, divert thrusters 18, attitude control thrusters 20, and a seeker 22. The divert thrusters 18 are located in a divert plane, z-y, normal to the seeker viewing axis x (i.e. reference axis).

To intercept the threat, the KV 14 uses its divert thrusters to position itself along a trajectory 24 (see numeral designations 14', 14" in FIG. 1) for a collision with the threat 12. This guidance is independent of the host aircraft 12 and is based on data provided by the KV seeker 22. Destruction of the threat (represented by numeral designation 26, in FIG. 1) is achieved by a kinetic collision between the KV 14 and the threat 12. The KV 14, in its preferred embodiment, does not require explosives or fuses.

The preferred technique used to intercept the threat involves two major elements: deceleration of the KV 14 parallel to the longitudinal axis of the aircraft 10, and translation in a plane z-y, perpendicular to the seeker axis x.

Prior to launch the KV 14 is secured within a launcher, designated generally as 28, in FIG. 3. The launcher 28 is preferably located at an aft portion of the aircraft 10, each seeker viewing axis, x, being parallel to the longitudinal axis of the aircraft x.

Following launch from the aircraft 10, the KV 14 decelerates rapidly due to aerodynamic drag. This deceleration provides a rapid separation between the aircraft 10 and KV 14. It also provides rapid closure with the threat 12 and reduces the KV 14 flight time required for intercept. While the KV 14 is decelerating longitudinally, its divert thrusters 18 are used to translate the KV 14 laterally and vertically in the divert plane, z-y, perpendicular to the seeker axis x. This plane of translation, z-y, defines a barrier to the approaching threat 12.

Referring now to FIG. 4, the threat detection, tracking and guidance functions and their interrelationships are illustrated in terms of the host platform, or launcher 28, and the KV 14. For threat detection, a search and track system 30 is provided for detecting an approaching threat and analyzing information regarding the threat's angular position. The analyzed information is input to a range measurement unit 32 for determining relevant distances and closure rates. Search and track system 30 and range measurement unit 32 cooperate to reduce false alarms.

The search and track system 30 may be, for example, a passive IR search and track set or an active radar set. The search and track system 30 must provide coverage of a solid angle appropriate to the anticipated threat volume and should be capable of handling multiple targets. The range measurement unit 32 may be a laser range finder or low probability of intercept (LPI) radar. These permit location of the threat in three dimensions and accurate determination of the trajectory and/or closing rate for use in determining an optimum launch time for the KV 14. If an active sensor is not provided, approximate ranges and closing rates of incoming threats can be determined utilizing passive ranging techniques such as measuring the rate of change of the IR source intensity and of angular position, to estimate the threat trajectory.

The range measurement unit 32 provides range and closure rate information to the launch computer 34. (The launch computer 34 and range measurement unit 32 form the fire control system.) The launch computer 34 determines the optimum time for a launch and transfers the appropriate signal to the launcher 36. The launch computer 34 also provides information on system status to the host avionics 38.

The angular position information is provided by the search and track system 30 to the KV seeker 22. Target assignment and, preferably, range information is passed from the launch computer 34 to the KV guidance computer 34 prior to launch. Boresight correlation may be provided between the seeker 22 on the KV 14 and the search and track system 30 to handle multiple targeting assignments.

Information relating to the angular offset of the threat from the normal to the KV thrust (divert) z-y plane is provided by the seeker 22 to the guidance computer 40. The Inertial Measurement Unit (IMU) 42 provides 3-axis attitude information to the seeker 22 and guidance computer 40. The guidance computer 40 determines the optimum trajectory for intercept and provides guidance information to the thrust control 44 which includes the attitude control thrusters 20 and divert thrusters 18.

The functional arrangement of the components in FIG. 4 may be modified to suit the particular capabilities of the threat warning system which is installed on board a particular host platform. For example, the threat warning system may not include a fully capable search and track system. However, it may include a tail warning sensor capable of providing coarse angular position or sector, with or without range information, that can be transferred to the KV seeker and guidance computer, as appropriate. In this case the KV seeker must have a relatively wide field of view at least equal to the angular uncertainty of the information provided by the tail warning sensor.

If range information is provided, a launch computer may be included in the host platform threat warning system for computing the best time to launch, as in the system of FIG. 4. Alternatively, this computer may be omitted and the computation provided by the guidance computer on board the KV. In other respects the operation of the threat warning and KV guidance systems is, as described in connection with FIG. 4.

In the event the host platform has no threat warning system and cannot accommodate the addition of such a system, the threat detection and tracking function may be accomplished on board the KV. In this case the sensor on board the KV must perform the search and track functions as well as the seeker guidance function. This requires a very wide field-of-view sensor with high resolution, approaching as nearly as possible (within size and monetary constraints) the performance of the search and track system included in the system of FIG. 4.

As an alternative to the above system configuration, where the host platform has no threat warning system, and/or the KV launcher is not accommodable by the host platform, the complete system represented in FIG. 4 or any modification of same may be installed in a pod to be mounted on the host platform.

Figure 5A:
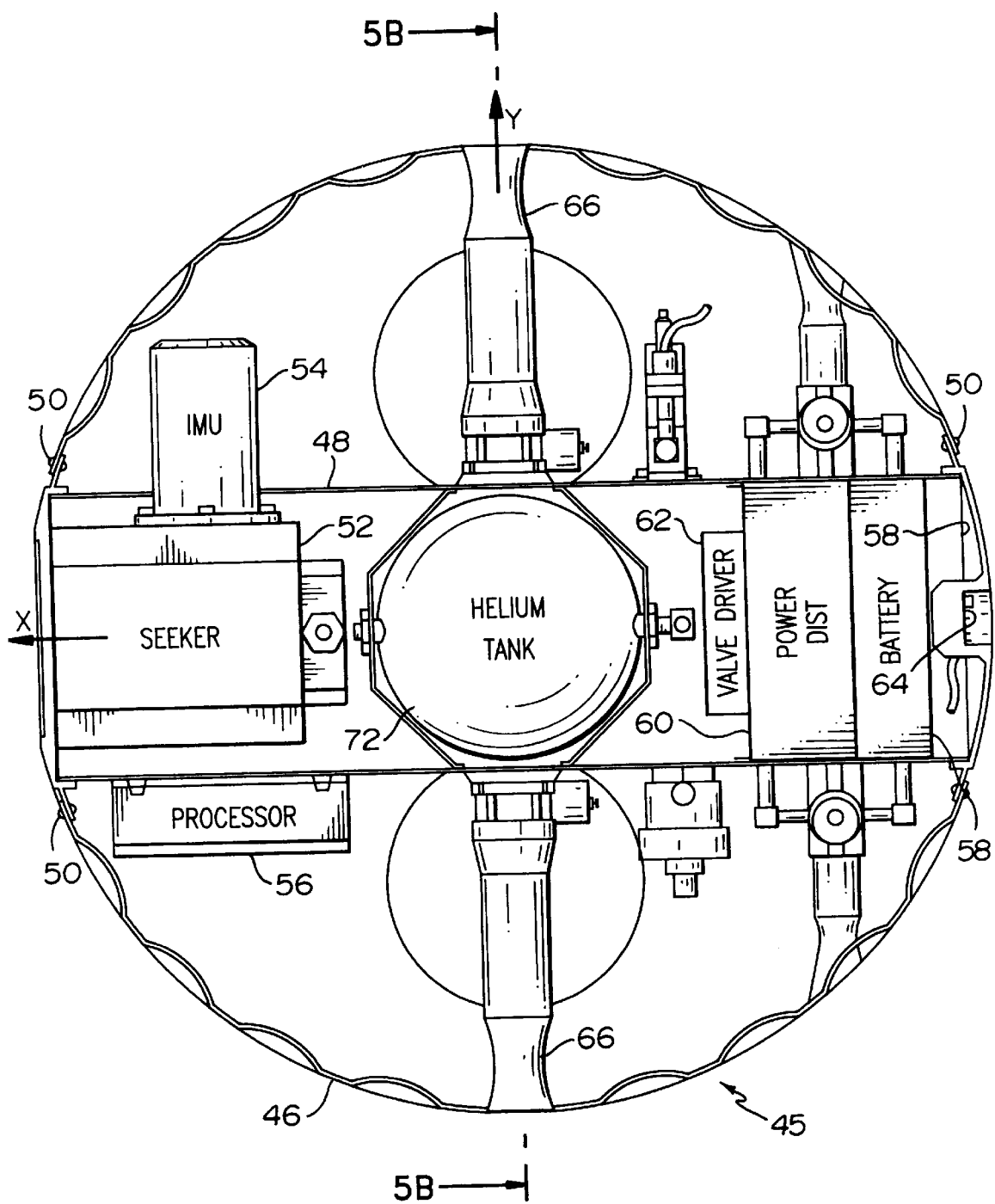
FIG. 5A is a cutaway plan view of the KV along the plane of the seeker axis to show propulsion component and avionics layout.
Figure 5B:
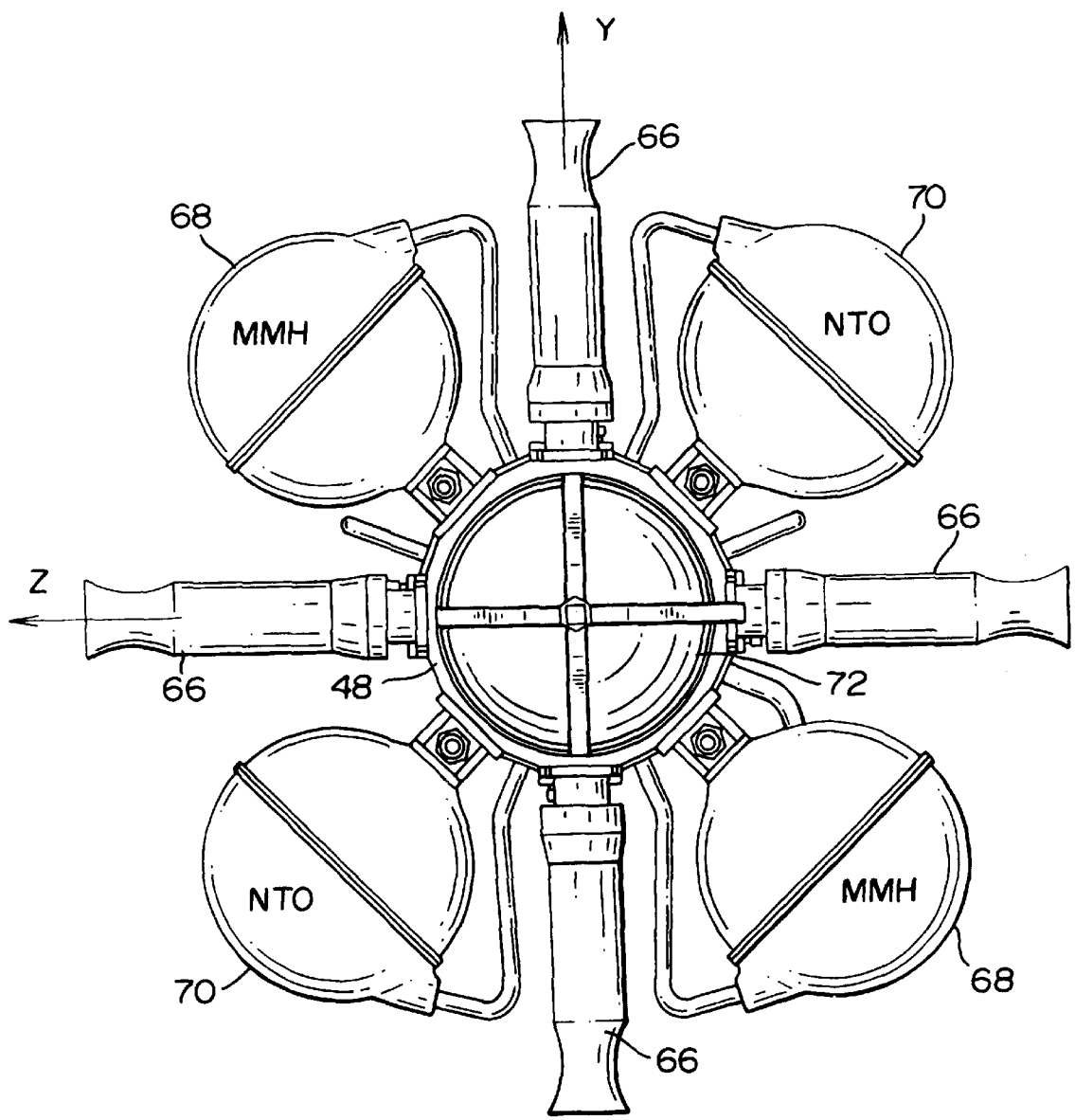
FIG. 5B is a view of the KV taken along line 5B—5B of FIG. 5A.
Figure 5C:
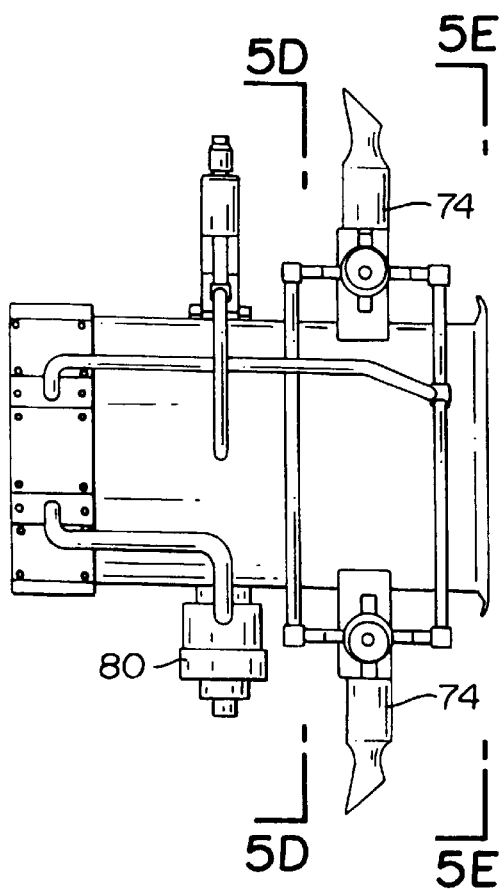
FIG. 5C is a view of the aft end of the KV illustrating the primary structure and externally mounted propulsion components.
Figure 5D:
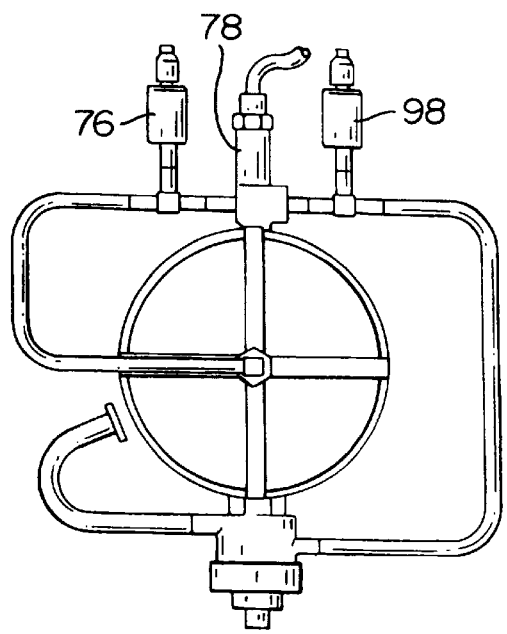
FIG. 5D is a view taken along line 5D—5D of FIG. 5C.
Figure 5E:
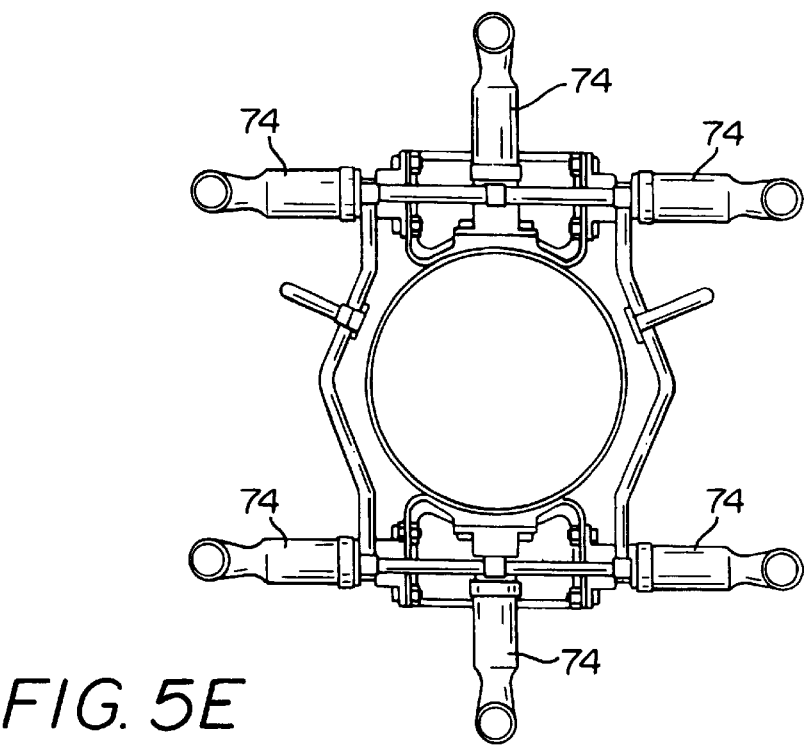
FIG. 5E is a view taken along line 5E—5E of FIG. 5C.

Referring now to FIGS. 5A, 5B and 5C, a preferred embodiment of the KV apparatus, designated generally as 45, is illustrated. The body 45 includes a two-piece spherical shell 46 preferably formed of aluminum or a composite material. The shell 46 has a uniformly textured outer surface having roughly equidistantly spaced dimples. The avionics and propulsion components are packaged by mounting the same to an internal cylindrical primary structure 48.

The ends of the primary structure 48 are connected to the shell 46 by threaded fasteners 50 (threaded or riveted). The two shell halves may be fastened, for example, using rivets or threaded fasteners.

The avionics include a seeker 52 (also illustrated as seeker 22 in FIG. 2), an inertial measurement unit (IMU) 54 (42 in FIG. 4), a processor 56, a battery 58, a power distribution device 60, a valve driver 62, and an umbilical disconnect 64. There is no telemetry on board, since, in the preferred embodiment the KV operates autonomously once released from the launcher. The seeker 52 is mounted to the primary structure 48, with the seeker viewing axis x pointing aft relative to the ballistic path of the jettisoned KV. The IMU 54 is mounted in close proximity to the seeker 52 to minimize vehicle attitude error due to structural deflection. The umbilical disconnect 64 is mounted at the opposite end of the primary structure 48 from the seeker 52, such that the ejection of the KV 45 from the host aircraft disengages the umbilical 64 while pointing the seeker 52 in the aft direction, x. The other avionic components are mounted to the primary structure 48 to balance the vehicle such that its center-of-mass lies at the centerpoint of the spherical shell, i.e. the "KV centerpoint".

As best illustrated in FIG. 5B, four divert thrusters 66 (also illustrated as divert thrusters 18 in FIG. 2) located in a divert plane z-y normal to the seeker viewing axis x are mounted on the outside periphery of the primary structure 48 pointing radially outward at each 90° location. Because the center-of-mass of the KV 45 coincides with the KV centerpoint, the thrust vector of the divert thrusters 66 act through the center-of-mass, minimizing disturbing torques to the KV due to thrust vector/center-of-mass offset.

Additionally, the aerodynamic center of the KV coincides with the KV centerpoint, regardless of the direction of its flight. This minimizes disturbance torques due to aerodynamic load vector/center-of-mass offset.

The dynamic masses, i.e. the propellants and pressurant, are also arranged such that their center-of-masses coincide with the KV centerpoint during utilization of the propellants. The four spherical propellant tanks 68, 70 are equally spaced between the divert thrusters 66 on the outside periphery of the primary structure 48. The two fuel tanks 68 and the two oxidizer tanks 70 are mounted opposite each other, respectively, to offset the dynamic center-of-mass shift due to propellant usage.

The center of the spherical pressurant tank 72 coincides with the KV centerpoint, which eliminates center-of-mass shift due to usage of the pressurant, since the center-of-mass of the pressurant is distributed uniformly about the center-of-mass of the KV throughout the mission. The pressurant is stored in the pressurant tank 72, and after initiation progressively flows to the four propellant tanks 68, 70, which are symmetrically mounted about the center-of-mass.

Pitch, yaw and roll stability Is afforded by six attitude control system (ACS) thrusters 74, which are mounted in a plane forward of the divert thrusters 66. The horizontally-oriented ACS thrusters provide roll and yaw control, while the vertically-oriented thrusters provide pitch control.

Figure 6:
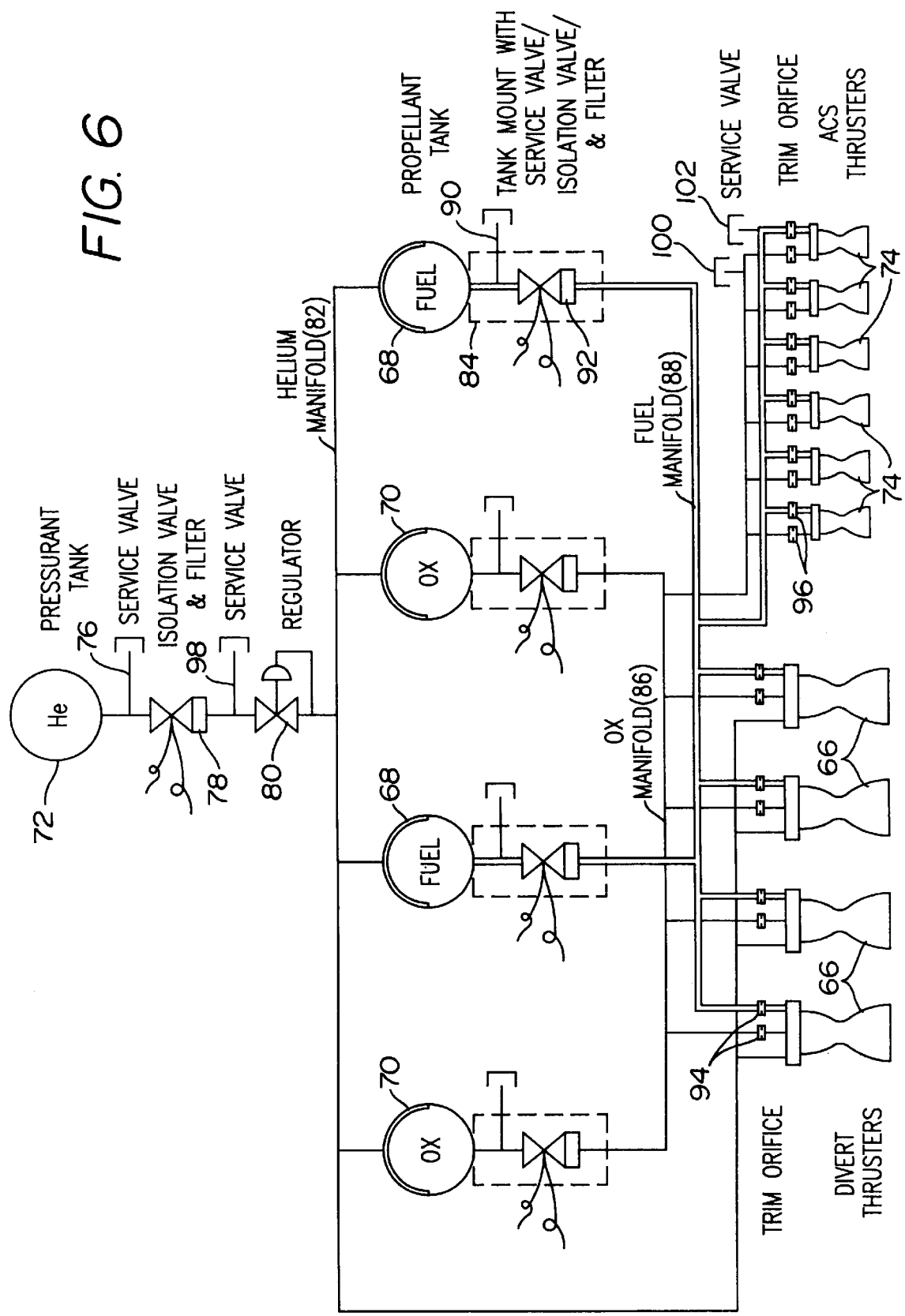
FIG. 6 is a schematic illustration of the KV propulsion system.

The bipropellant, pressure-fed propulsion system is shown schematically in FIG. 6. The propellants are nitrogen tetroxide (NTO) as the oxidizer and monomethyl hydrazine (MMH) as the fuel. This provides hypergolic ignition. Helium is the pressurant.

The pressurant tank 72 is loaded to 10,000 psi through the service valve 76. The pressurant is contained entirely within the pressurant tank 72 until the pyrotechnically actuated helium isolation valve 78 is opened. Actuating the helium isolation valve 78 shears a metallic nipple to allow helium to flow to the regulator 80. The regulator 80 provides a constant pressure to the helium manifold 82, propellant tanks 68, 70 and divert thrusters 66.

Each propellant tank 68, 70 has a metallic diaphragm, which contains the propellant within the tank and prevents the propellants from mixing in the helium manifold 82. The helium pressure acting on the diaphragm forces the propellant through the tank mount 84 and into the propellant manifolds 86 and 88. As the propellant is utilized through the divert thrusters 66 and ACS thrusters 74, the diaphragms reverse to positively push the propellant out of the tanks.

The tank mount 84 provides a means to bolt the propellant tank to the primary structure 48. Each tank mount 84 houses a service valve 90, isolation valve 92, and filter. The service valve 90 is provided for loading propellant into the propellant tank 68, 70. The isolation valve 92 contains the propellant in the propellant tank 68, 70 until pyrotechnically actuated, after which the propellant is free to flow into the propellant manifolds 86 and 88. The filter prevents particulate contamination from entering the propellant manifolds 86, 88.

The helium manifold 82, oxidizer manifold 86 and fuel manifold 88 are integral channels imbedded circumferentially within the wall of the primary structure 48. Passages into and out of the manifolds are provided by ports through the outer surfaces of the structure into the manifold. The divert thrusters, tube flanges, and propellant tanks are bolted onto the flat surfaces on the periphery of the primary structure 48, with O-rings to provide sealing between the components and the structure.

The divert thrusters 66 and ACS thrusters 74 have trim orifices 94, 96, respectively, to calibrate the flow rate of propellants into the thrusters. The trim orifices 94 for the divert thrusters 66 are located in the mounting face of the divert thrusters 66 and are sealed with o-rings. The trim orifices 96 for the ACS thrusters 74 are welded into the inlet lines of the ACS thrusters 74.

The thrusters are fired on demand for divert maneuvers and attitude control, and are capable of steady-state or pulse-mode operation. The thrusters are fired by electrically energizing the solenoids of the individual thruster valves. These valves are spring-loaded closed while the solenoids are in the unenergized state.

The bipropellant thrusters are capable of on-off operation at rates as fast as 100 hertz and have a rapid thrust rise time of less than 5 milliseconds to 90 percent rated thrust level. Maximum thrust of the described divert thrusters is preferably 170 lbs.

Service valves 98, 100 and 102 are utilized for leak checking the helium, oxidizer and fuel manifolds, 82, 86, 88 respectively.

The seeker 52 provides for transmission of the optical data to its focal plane. The focal plane data is sent to processor 56, along with the vehicle attitude data from the IMU 54, to determine the vehicle flight corrections and maneuvers required to intercept the threat. The corrections are relayed to the valve driver 62, which commands the appropriate divert and ACS thruster valve(s) 66, 74 open. The data is reevaluated and new commands are given, nominally, every 10 milliseconds.

The battery 58 provides the on-board power for the electric and electronic devices. The power distribution device 60 provides properly conditioned power for each electrical component's requirements.

The spherical shell 46 preferably has a diameter in a range of between ten and fourteen inches. In an embodiment with a twelve inch diameter, the attitude control thrusters may be mounted in a plane approximately 4.7 inches forward the divert plane to provide a moment arm for pitch and yaw control. The approximate weight range of the KV is between 15 and 25 pounds.

Figure 7:
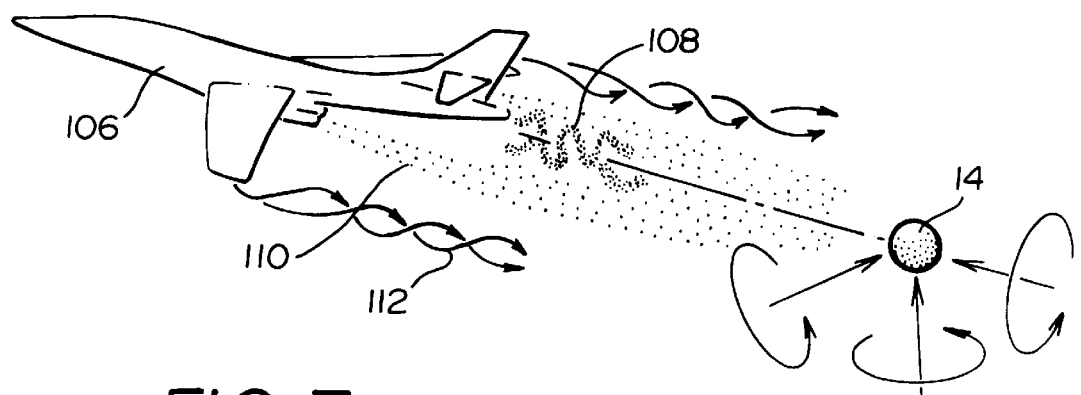
FIG. 7 is a schematic illustration of the KV environment, illustrating aerodynamic considerations.

Referring now to FIG. 7, a schematic illustration of the KV environment illustrating aerodynamic considerations is shown.

The kinematics of the trajectory to successfully achieve a collision with the threat and the basic problems of launching any device from an aircraft 106 introduces a kinetic kill device to a violently turbulent environment comprised of the aircraft wake 108, jet exhaust 110, and tip vortices 112 as well as a wide range of potential wind incidence angles. These effects produce potentially large forces and moments on the KV 14, which could exhaust a limited fuel supply.

The turbulence may be divided into two characteristic components, a uniform gust intensity field and a rotational or velocity shear flow. The uniform gust contributes to the sizing of the divert thrusters, and the rotational gust sizes the attitude stabilization thrusters used to maintain the angular orientation of the thrust plane and seeker axis relative to the earth reference system.

Figure 8:
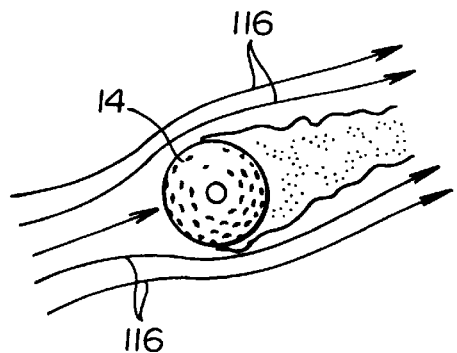
FIG. 8 illustrates the aerodynamic symmetry of a spherical KV.

In order to minimize the size and weight of the device, the stabilization requirements due to these disturbances must be minimized. Referring to FIG. 8, it is illustrated that a spherical shape is preferred for the KV 14, due to a sphere's inherent aerodynamic symmetry (see lines 116 of symmetry). The static moments generated by a uniform flow field are minimized with a sphere as compared to the natural tendency for an arbitrary shape to weather vane or tumble. Since the device is required to laterally and vertically translate to position for a kinetic intercept while decelerating in the longitudinal axis, a very large range of wind incidence angles are possible.

Due to the presence of the thruster nozzle orifices on the surface of the sphere, additional moments may be generated increasing the required thrust for stabilization. A uniformly rough surface texture minimizes this effect.

The size of the vehicle determines the aerodynamic drag and therefore the separation characteristics and the limits of its lateral envelope. As drag increases, the time aloft is reduced, but the lateral envelope is also reduced. Sizing of the divert thrusters and fuel requirements depend upon the size of the device and the end-game requirements for collision. The sizing of the attitude stabilization thrusters is determined by the wake disturbance and aerodynamic stability and control requirements. A uniformly rough surface offers the best solution for minimizing stability and control requirements which, in turn, reduce the size and weight of the device.

Figure 9:
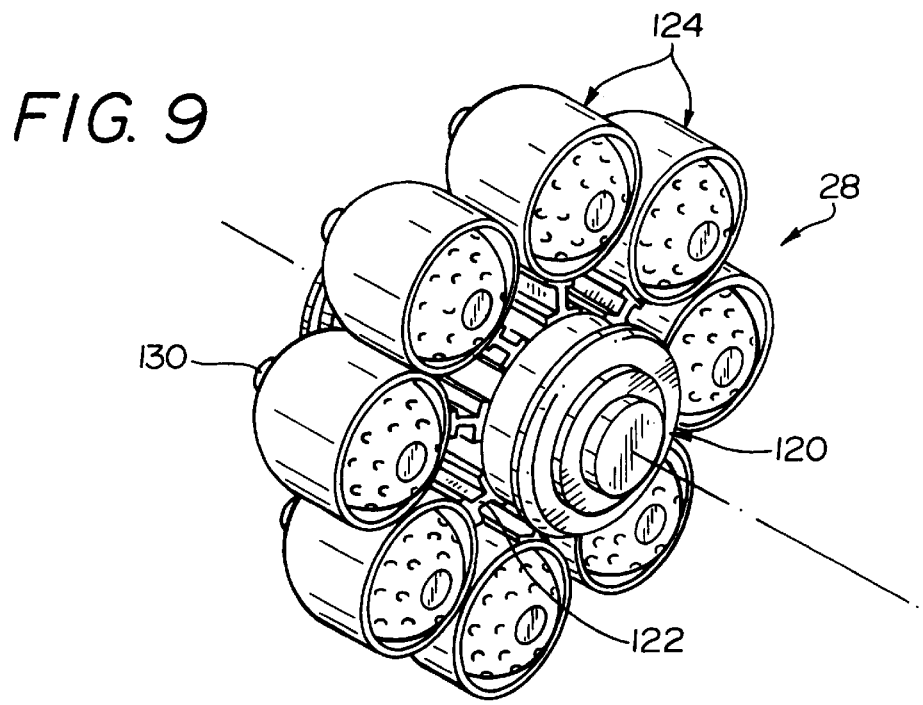
FIG. 9 is an enlarged perspective view of a preferred launcher apparatus for multiple deployment of KVs.

Referring back now to FIG. 3 and also to FIG. 9, a launching apparatus 28 is illustrated which is preferably attached to a structural support (not shown) within the host aircraft. The host aircraft 10 includes an external fairing 118 with an aft opening which provides a field of view for a portion of the launching apparatus 28, as will be more fully described below.

The apparatus 28, for launching, includes a rotary launcher 120 attached to the host aircraft 10. The launcher 120 has a plurality of support fittings 122 thereon. Each support fitting 122 is used for mounting a respective launch tube assembly 124. A plurality of projectile retention means 126 are provided for securely retaining each KV 128, previously illustrated as KV 14, in FIG. 1, within its respective launch tube assembly 124. A plurality of ejection cartridges 130 are provided, each being mounted to a respective launch tube assembly 124. Each ejection cartridge interfaces with a respective projectile retention means 126 to provide an ejection thereof.

Figure 10:
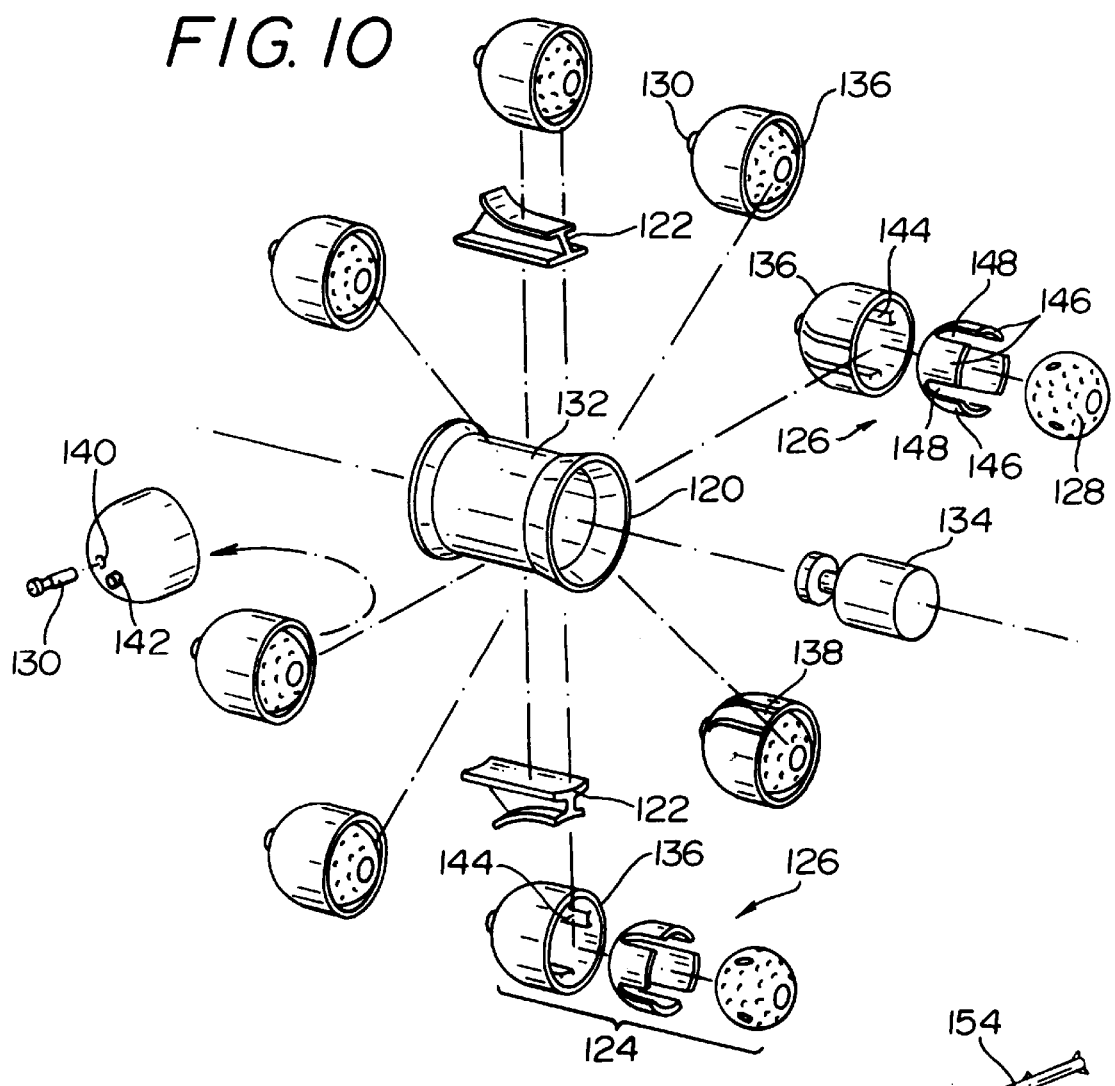
FIG. 10 is an exploded perspective view of the launcher illustrated in FIG. 9.

The rotary launcher includes a central rotatable hub 132 mounted in the host aircraft. The support fittings 122 extend radially outward from the hub 132. As can be seen in FIG. 10 the rotary launcher 120 also includes a drive motor 134 mounted within the central rotatable hub 132. Each launch tube assembly 124 includes a rigid shell 136, a shell mount 138, a cartridge housing 140, and an umbilical connector 142. The rigid shell 136 contains the retention means 126 and KV 128. Each shell 136 has stabilization races 144 formed on an inner surface thereof. The shell mounts 138 support each rigid shell 136 to its respective support fitting 122. Each cartridge housing 140 is mounted on a rear portion of a shell 136 for containing the ejection cartridge 130. The umbilical connectors 142 provide KV/host aircraft electrical and cooling interfaces.

Each projectile retention means 126 is preferably formed of a rigid foam having a thermal protective coating. The foam partially encapsulates the KV and secures it to the launch tube assembly 124 while distributing the thrust load from the ejection cartridge 130. The rigid foam provides a pressure seal that contains ejection cartridge gas until an adequate pressure is obtained to propel the KV 128 and retention means 126 at the prescribed velocity. The rigid foam may be, for example, plastic, teflon, or ceramic. The coating may be, for example, metal foil or a ceramic. The foam is preferably in sections 146 which separate forming a sabot when the KV is launched. Each foam section 146 includes at least one stabilization track 148 for mating with an associated stabilization race 144 on the shell. Each ejection cartridge 130 is preferably an interchangable electrically ignited pyrotechnic device or an electrically actuated compressed gas cartridge, providing a large volume of gas to propel the projectile 128 at the prescribed velocity.

As noted, the host aircraft 10 includes an external fairing 118 with an aft opening. During operation, the rotary launcher 28 rotates to position a launch tube assembly 124 in a position adjacent to the aft opening to allow sequential projectile launch. Each launch tube assembly 124 is of sufficiently short length to provide a 60 degree conical field-of-view relative to a center of the KV. The KV is preferably deployed in a manner parallel to the aircraft line of flight.

Obviously, other modifications and variations of the present invention are possible in light of the above teachings. It is, therefore, to be understood that, within the scope of the appended claims, the invention may be practiced otherwise than as specifically described.

Figure 11:
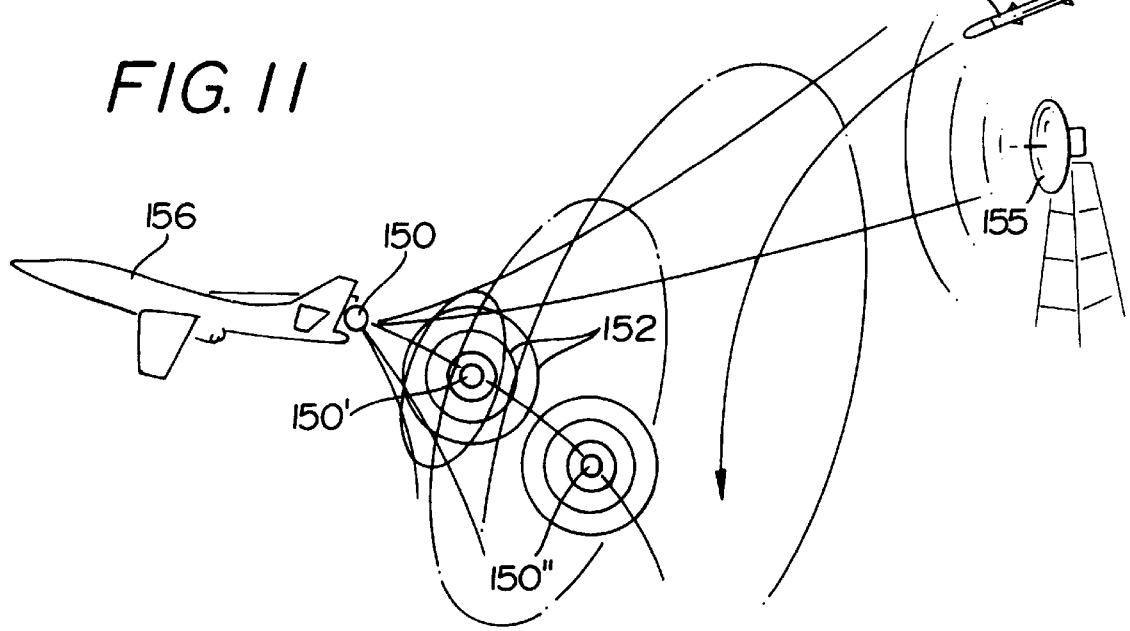
FIG. 11 illustrates a decoy engagement scenario for a decoy embodiment of the KV.

For example, although the present inventive concepts have been described in detail with respect to a seek and kill scenario, these principles may be readily extendable to application of the KV as a decoy, for example to counter SAMs and interceptors. Referring now to FIG. 11, in a decoy scenario the KV apparatus 150 is equipped with means for emitting a signal 152 for diverting the threat 154 away from the vehicle 156, thereby eliminating the threat. In this instance, the requirement of a seeker is obviated.

In one decoy embodiment, the KV is outfitted with a broadband RF repeater. A threat 154 using radar 155 guidance is pulled off the protected aircraft 156 by a stronger RF return emanating from the KV 150. In this instance, the KV is programmed to fly away from the host aircraft, as illustrated by numeral designations 150', 150" eliminating the chance of the missile flying through the decoy into the protected aircraft.

In another embodiment, in order to protect the host aircraft from an infrared seeking threat, the KV is modified to produce a high IR signature while flying away from the host. The IR missile loses track of the host vehicle and closes in on the KV.

In yet another decoy embodiment, the signal is emitted by reflection of a signal received by the threat.

It is to be understood that in the seek and kill scenario, it is not necessary that a kill be provided solely by a kinetic collision. For example, the KV may be equipped with explosives or other disabling means such as nets for obstructing the progress of the threat.

Furthermore, it is understood that divert propulsion is not limited to that which is solely perpendicular to the reference axis. Additional thrust means may be added to provide the body an axial velocity in the direction of the threat, if necessary, to improve the efficiency of the device. However, it is understood that the threat velocity and not any KV axial velocity is the primary mechanism for providing closure between the KV and the threat.

With respect to the launching system mentioned, although a rotary launcher has been illustrated, other launchers such as linear launchers may be used. In this respect launch tube assemblies may be arranged in a linear fashion for installation on smaller host aircraft. An alternative to using the proposed ejection cartridge launch mechanism for KV launcher separation may include use of the KV divert thrusters or aerodynamic pressure to achieve such a separation.

U.S. bombers can benefit greatly from a KV defensive system. Installed on a launcher and integrated with the existing aircraft defense systems, the KV can significantly improve bomber survivability.

A key requirement for tactical aircraft (both fighters and ground attack aircraft) is to be able to operate and release weapons at medium altitudes because of increased targeting opportunity and manufacturing flexibility in this altitude region. However, this is the flight regime with the highest potential of attacks from interceptors and SAMs. The defensive capability of the KV system would allow tactical aircraft (which otherwise could not perform combat operations at medium altitude because of unacceptable attrition) to achieve less restricted medium-altitude air combat capability. The resulting improvement in mission effectiveness of tactical air forces would be significant.

SOF aircraft such as the AC-130 U are typically slow and unable to maneuver against a threat. They are also large and difficult to mask against sophisticated electronic detection and tracking technologies available globally. The KV system allows these aircraft to defend themselves without engaging overt hostilities while over flying politically sensitive areas, thus, improving the survivability and operational utility of these air vehicles.

The benefits to cargo aircraft are similar to SOF aircraft. Inter-theater airlifters such as the C-141 and C-5A would benefit from KV defensive systems during a high intensity conflict. A KV defensive system for intra-theater and medium haul airlifters that deliver cargo and troops into "hot" areas would be beneficial for the enhanced survivability and extending the useful penetration range of these aircraft.

A KV defensive support system would be useful for installation in executive aircraft, such as Air Force 1, protecting key personnel from a terrorist situation.

Although application of the KV concept has been described with respect to atmospheric vehicles, it may also be used for extraterrestrial vehicles. For example, it may be used to protect satellites, space stations, space shuttles and other extraterrestrial vehicles.

Furthermore, it has naval applications and application to ground forces. For example, the U.S. Navy has off-board IR and RF jammers. For those threat systems not defeated by these passive system, some form of active lethal defense is required. The killer volleyball concept presents a solution to this problem. Missile defense systems, such as the Phalanx, currently installed on the surface fleet could be supplemented with a KV defense system. Tanks, infantry, fighting vehicles and armored personnel carriers are vulnerable to the wire-guided anti-tank missile. A KV defense system that intercepts these missiles may be utilized.

In all applications the divert thrusters cooperate with the attitude control thrusters to 1) position the reference axis (i.e. seeker axis or emitter axis) to a desired angular orientation relative to the threat, and 2) translate the body substantially perpendicular to the reference axis so as to eliminate the threat. The primary means of closure in either a decoy or kinetic kill is provided by the threat's velocity rather than the velocity of the KV. This obviates any requirement for a relatively powerful axial propulsion system which is required in guided missiles, such as the device disclosed in the Rae patent.

What is claimed and desired to be secured by Letters Patent of the United States:

1. A system for defending a vehicle traveling at a substantial velocity, comprising:
   (a) means for identifying a threat approaching said vehicle;
   (b) means for deploying a rigid body from said vehicle, said means for deploying the body being separate from said rigid body, said means for deploying providing a force sufficient to provide separation from said vehicle but being insufficient to generate an intercept trajectory, primarily; and
   (c) means associated with said body for providing controlled, guided propulsion of said body to position a reference axis of said body to a desired angular orientation relative to the threat and to translate said body substantially perpendicular to said reference axis so as to eliminate said threat, the intercept velocity of said rigid body being primarily provided by aerodynamic drag acting on said rigid body upon deployment from said vehicle.

2. The system of claim 1 wherein said means for identifying said threat includes means for analyzing information received regarding the threat's location and closure rate.

3. The system of claim 1 wherein said means for deploying includes means for positioning said reference axis, to a desired position relative to the threat prior to deployment.

4. The system of claim 1 where said means for deploying includes means for transferring information from said vehicle to said rigid body regarding the threat position and trajectory prior to said deployment.

5. The system of claim 1 wherein said means for providing controlled, guided propulsion include s means for tracking said threat to maneuver said body for a collision with the threat, thereby providing a kinetic kill and elimination of the threat.

6. The system of claim 1 wherein said means for providing controlled, guided propulsion includes means for emitting a signal for diverting the threat away from the vehicle, thereby eliminating said threat.

7. A method of defending a vehicle traveling at a substantial velocity, comprising the steps of:
   (a) identifying a threat approaching said vehicle;
   (b) controllably deploying a body from said vehicle, the deployment being provided by deployment means being separate from said body, said body having an outer surface thereon with a substantially circular cross section about at least one reference axis thereon,
      a plurality of spaced divert thruster means associated with said body, said thruster means for translating said body relative to said threat upon deployment from said vehicle,
      a plurality of spaced attitude control thruster means associated with said body for providing roll, pitch and yaw to orient said reference axis to a desired orientation relative to said threat, and
      a guidance system associated with said reference axis for communicating electronic signals to said attitude control thruster means and divert thruster means; and
   (c) controlling the position of said body relative to the threat by utilization of said divert thruster means, attitude control thruster means and said guidance system, thereby eliminating said threat, the intercept velocity of said rigid body being primarily provided by aerodynamic drag acting on said rigid body upon deployment from said vehicle.

8. The method of claim 7 wherein said step of identifying said threat includes analyzing information received regarding the threat's location and closure rate.

9. The method of claim 7 wherein said step of controllably deploying includes positioning said reference axis to a desired position relative to the threat prior to deployment.

10. The method of claim 7 wherein said step of controllably deploying includes the steps of:
    (a) transferring information from said vehicle to said rigid body regarding the threat position and trajectory prior to said deployment, and
    (b) utilizing said information to position said reference axis to a desired position relative to the threat after deployment.

11. The method of claim 7 wherein said step of controlling the position includes the step of tracking said threat to maneuver said body for a collision with the threat, thereby providing a kinetic kill and elimination of the threat.

12. The method of claim 7 wherein said step of controlling the position includes the step of emitting a signal for diverting the threat away from the vehicle, thereby eliminating said threat.

13. The method of claim 7 wherein said body is controllably deployed from said moving vehicle in the atmosphere from a location on said vehicle which allows sufficient drag forces to separate the body from the vehicle while the body translates in a plane perpendicular to said reference axis.

14. The method of claim 7 wherein said body is controllably deployed from a location on said vehicle which allows said divert thruster means to separate the body from the vehicle while the body translates in a plane perpendicular to said reference axis.

15. A system for defending an atmospheric vehicle traveling at a substantial velocity, comprising:

(a) means for identifying a threat approaching said vehicle;

(b) means for deploying a rigid, spherical body from said vehicle, said means for deploying the body being separate from said rigid body, said means for deploying providing a force sufficient to provide separation from said vehicle but being insufficient to generate an intercept trajectory; and (c) means, associated with said body, for providing controlled, guided propulsion thereof to position a reference axis of said body to a desired angular orientation relative to the threat and to translate said body substantially perpendicular to said reference axis so as to eliminate said threat, the intercept velocity of said rigid body being primarily provided by aerodynamic drag acting on said rigid body upon deployment from said vehicle.

16. The system of claim 15 wherein said means for identifying said threat includes means for analyzing information received regarding the threat's location and closure rate.

17. The system of claim 15 wherein said means for deploying includes means for positioning a reference axis which is associated with said body, to a desired position relative to the threat prior to deployment.

18. The system of claim 15 wherein said means for deploying includes:

means for transferring information from said vehicle to said rigid body regarding the threat position and trajectory prior to said deployment.

19. The system of claim 15 wherein said means for providing controlled, guided propulsion includes means for tracking said threat to maneuver said body for a collision with the threat, thereby providing a kinetic kill and elimination of the threat.

20. The system of claim 15 wherein said means for providing controlled, guided propulsion includes means for emitting a signal for diverting the threat away from the vehicle, thereby eliminating said threat.

21. The system of claim 15 wherein said means for deploying includes means for deploying from said moving vehicle in the atmosphere from a location on said vehicle which allows sufficient drag forces to separate the body from the vehicle while the body translated in a plane perpendicular to said reference axis.

22. A system for defending a vehicle traveling at a substantial velocity, comprising:

(a) means for identifying a threat approaching said vehicle;

(b) means for controllably deploying a body from said vehicle, the deployment being provided by deployment means being separate from said body, said body having an outer surface thereon with a substantially circular cross section about at least one reference axis thereon, a plurality of spaced divert thruster means associated with said body, said thruster means for translating said body relative to said threat upon deployment from said vehicle, a plurality of spaced attitude control thruster means associated with said body for providing roll, pitch and yaw to orient said reference axis to a desired orientation relative to said threat, and a guidance system associated with said reference axis for communicating electronic signals to said attitude control thruster means and divert thruster means; and (c) means for controlling the position of said body relative to the threat by utilization of said divert thruster means, attitude control thruster means and said guidance system, thereby eliminating said threat, the intercept velocity of said rigid body being primarily provided by aerodynamic drag acting on said rigid body upon deployment from said vehicle.

23. The system of claim 22 wherein said means for identifying said threat includes means for analyzing information received regarding the threat's location and closure rate.

24. The system of claim 22 wherein said means for controllably deploying includes means for positioning said reference axis to a desired position relative to the threat prior to deployment.

25. The system of claim 22 wherein said means for controllably deploying includes means for transferring information from said vehicle to said rigid body regarding the threat position and trajectory prior to said deployment.

26. The system of claim 22 wherein said means for controlling the position includes means for tracking said threat to maneuver said body for a collision with the threat, thereby providing a kinetic kill and elimination of the threat.

27. The system of claim 22 wherein said means for controlling the position includes means for emitting a signal for diverting the threat away from the vehicle, thereby eliminating said threat.

28. The system of claim 22 wherein said means for controllably deploying includes means for deploying from said moving vehicle in the atmosphere from a location on said vehicle which allows sufficient drag forces to separate the body from the vehicle while the body translates in a plane perpendicular to said reference axis.

29. The system of claim 22 wherein said body is controllably deployed from a location on said vehicle which allows said divert thruster means to separate the body from the vehicle while the body translates in a plane perpendicular to said reference axis.

* * * * *